US006767653B2

(12) United States Patent
Bewlay et al.

(10) Patent No.: US 6,767,653 B2
(45) Date of Patent: Jul. 27, 2004

(54) COATINGS, METHOD OF MANUFACTURE, AND THE ARTICLES DERIVED THEREFROM

(75) Inventors: Bernard Bewlay, Schenectady, NY (US); Melvin Jackson, Niskayuna, NY (US); Ji-Cheng Zhao, Latham, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/331,190

(22) Filed: Dec. 27, 2002

(65) Prior Publication Data

US 2004/0126613 A1 Jul. 1, 2004

(51) Int. Cl.$^7$ ............................. F03B 3/12; B32B 15/01
(52) U.S. Cl. ....................... 428/660; 428/632; 428/666; 428/662; 428/650; 416/241 R; 148/422; 148/423; 420/425; 420/426; 420/428; 420/552; 420/588; 420/589
(58) Field of Search .................................. 428/650, 655, 428/660, 661, 662, 663, 666, 632; 416/241 R, 241 B; 148/422, 423, 442, 437; 420/425, 426, 429, 428, 552, 583, 588, 589

(56) References Cited

U.S. PATENT DOCUMENTS

| 3,785,787 | A | | 1/1974 | Yokota et al. |
|---|---|---|---|---|
| 4,382,909 | A | * | 5/1983 | Zwingmann ................ 420/588 |
| 5,380,375 | A | | 1/1995 | Hashimoto et al. |
| 5,393,356 | A | | 2/1995 | Singheiser |
| 5,454,884 | A | | 10/1995 | Hashimoto et al. |
| 5,595,616 | A | | 1/1997 | Berczik |
| 5,693,156 | A | | 12/1997 | Berczik |
| 5,833,773 | A | | 11/1998 | Bewlay et al. |
| 6,409,848 | B1 | | 6/2002 | Bewlay et al. |
| 6,419,765 | B1 | | 7/2002 | Jackson et al. |
| 6,428,910 | B1 | | 8/2002 | Jackson et al. |
| 6,447,623 | B1 | | 9/2002 | Jackson et al. |
| 2001/0012491 | A1 | | 8/2001 | Strietzel |
| 2002/0104594 | A1 | | 8/2002 | Jackson et al. |
| 2002/0104595 | A1 | | 8/2002 | Jackson et al. |
| 2002/0119340 | A1 | | 8/2002 | Zhao et al. |

FOREIGN PATENT DOCUMENTS

| EP | 0286127 A1 | | 4/1988 |
|---|---|---|---|
| GB | 1176687 | * | 1/1970 |
| JP | 50102519 A2 | | 8/1975 |

OTHER PUBLICATIONS

DE1973306 C1. Publication Date May 6, 1999. Abstract only 1 page.
FR2654747 A1. Publication Date May 24, 1991. Abstract only 1 page.
JP4333347 A2. Publication Date Nov. 20, 1992. Abstract only 1 page.
JP4358054 A2. Publication Date Dec. 11, 1992. Abstract only 1 page.

(List continued on next page.)

*Primary Examiner*—Jennifer McNeil
(74) *Attorney, Agent, or Firm*—Paul J. DiConza; Patrick K. Patnode

(57) ABSTRACT

A turbine component comprises a substrate; and a crystalline coating disposed on a surface of the substrate, wherein the crystalline coating comprises tin and yttrium in an amount greater than or equal to about 0.05 atomic percent based upon the total coating. A method of making a turbine component comprises disposing a coating composition on a substrate, wherein the coating composition comprises tin and yttrium in an amount greater than or equal to about 0.1 atomic percent based upon the total coating composition. A crystalline coating comprises tin and yttrium in an amount greater than or equal to about 0.05 atomic percent based upon the total coating.

17 Claims, 8 Drawing Sheets

OTHER PUBLICATIONS

JP6170584 A2. Publication Date Jun. 21, 1994. Abstract only 1 page.

JP63290236 A2. Publication Date Nov. 28, 1988. Abstract only 1 page.

JP11226778 A2. Publication Date Aug. 24, 1999. Abstract only 1 page.

JP11293410 A2. Publication Date Oct. 26, 1999. Abstract only 1 page.

JP2001279387 A2. Publicaiton Date Oct. 10, 2001. Abstract only 1 page.

* cited by examiner

Sample 7      Sample 8

COATINGS, METHOD OF MANUFACTURE, AND THE ARTICLES DERIVED THEREFROM

STATEMENT REGARDING FEDERALLY SPONSORED RESEARCH AND DEVELOPMENT

The United States Government may have certain rights in this invention pursuant to Contract No. F33615-98-C-5215, awarded by the United States Air Force, United States Department of Defense.

BACKGROUND OF INVENTION

This disclosure generally relates to turbine systems, and more particularly to environmentally resistant coatings for the various components employed in such turbine systems.

Turbines are devices that generate rotary mechanical power from the energy in a stream of moving-fluid, and may be used in aircraft, watercraft (both marine and fresh water), various types of landcraft, and the like. Materials from which turbine components may be fabricated typically include those from a class of materials known as superalloys, particularly superalloys in which the base constituent is an alloy of nickel (Ni), iron (Fe), or cobalt (Co). Despite their generally superior chemical and physical properties, temperature constraints, particularly for single-crystal nickel-based superalloys, can limit the use of such superalloys in turbine engines in which extreme temperature conditions may be experienced.

In order to overcome some of the temperature limitations of these superalloys, newer materials based on niobium (Nb) and molybdenum have been developed. The niobium based materials used in turbine applications are termed niobium based refractory metallic-intermetallic composites (hereinafter Nb based RMICs), while those based on molybdenum are termed molybdenum-silicide based composites. Both Nb based RMICs and molybdenum-silicide based composites have melting temperatures greater than 1700° C., which exceeds the current temperature service limit of nickel based superalloys.

Although the Nb based RMICs and molybdenum-silicide based composites display high melting temperatures, they can undergo rapid oxidation at temperatures of about 1090° C. to about 1370° C. In addition, another type of oxidation, generally termed as 'pesting', occurs at intermediate temperatures of about 760° C. to about 990° C. Pesting is a phenomenon that is characterized by the disintegration of a material into pieces or powders after exposure to air at intermediate temperatures. Refractory metals, particularly molybdenum, exhibit poor resistance to pesting oxidation. It is therefore desirable to be able to manufacture turbine components that are capable of withstanding service temperatures of greater than or equal to about 1000° C., that have an increased resistance to oxidation at temperatures of about 1090° C. to about 1370° C., and that have an increased resistance to pesting at temperatures of about 760° C. to about 980° C.

SUMMARY OF INVENTION

A turbine component comprises a substrate; and a crystalline coating disposed on a surface of the substrate, wherein the crystalline coating comprises tin and yttrium in an amount greater than or equal to about 0.05 atomic percent based upon the total coating.

In one embodiment, a method of making a turbine component comprises disposing a coating composition on a substrate, wherein the coating composition comprises tin and yttrium in an amount greater than or equal to about 0.1 atomic percent based upon the total coating composition.

In another embodiment, a crystalline coating comprises tin and yttrium in an amount greater than or equal to about 0.05 atomic percent based upon the total coating.

The above described and other features are exemplified by the following figures and the detailed description.

DETAILED DESCRIPTION

Figure 1:
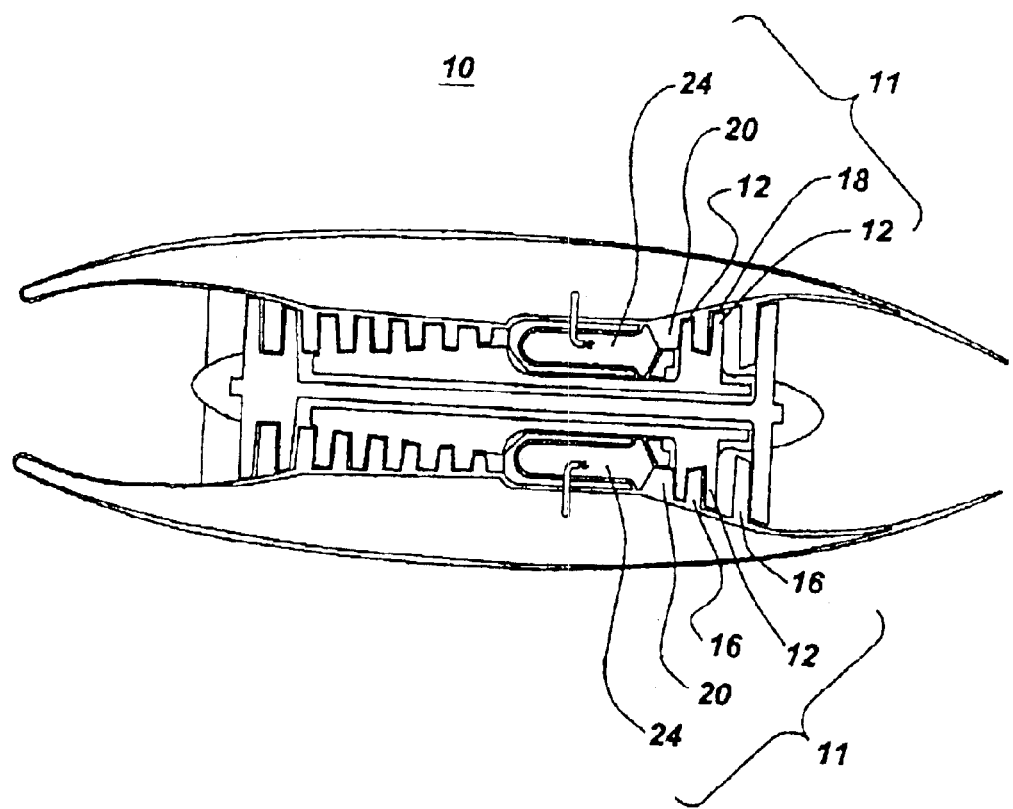
FIG. 1 is a schematic representation of a cross-sectional view of a turbine system.

Disclosed herein is a crystalline, environmentally resistant coating composition comprising tin and yttrium, wherein the total amount of tin and yttrium is greater than or equal to about 0.1 atomic percent based upon the total coating composition. The novel coating composition can be applied to Nb based RMICs and molybdenum-silicide based composites used as turbine components to form a coating that improves resistance to oxidation at temperatures of about 1090° C. to about 1370° C. These coatings also provide Nb based RMICs and molybdenum-silicide based composites with an increased resistance to pesting at temperatures of about 760° C. to about 980° C. Also disclosed herein is a method for depositing the above coating on turbine components.

In the following detailed description, like reference characters designate like or corresponding parts throughout the several views shown in the figures. Furthermore, it is also understood that the illustrations are for the purpose of describing various embodiments and are not intended to be construed as being limiting in any manner.

Referring to the drawings in general and to FIG. 1 in particular, a schematic diagram of a turbine system 10 is shown. Turbine system 10 may be utilized in various applications such as aircraft, watercraft (e.g., marine and fresh water such as those that operate on rivers, lakes, and the like), landcraft, land based power generation units, and the like. The turbine system 10 comprises a number of turbine components 11 that are subject to temperatures of greater than or equal to about 1150° C. during normal operation. These turbine components 11 include, but are not limited to: rotating blades 12, non-rotating vanes 16, shrouds 18, nozzles 20, combustors 24, and the like. Such turbine components 11 may be formed from Nb based RMICs or from molybdenum-silicide based composites and have service temperatures that are either comparable to or exceed the service temperatures of similar components formed from the nickel-based superalloys that are presently utilized.

In one exemplary embodiment, the Nb based RMICs that may be used to form the turbine components 11 of the turbine system 10 may comprise titanium, hafnium, silicon, chromium, and niobium. The Nb based RMICs preferably comprise about 19 to about 24 atomic percent titanium (Ti), about 1 to about 5 atomic percent hafnium (Hf), about 11 to about 22. atomic percent silicon (Si), about 5 to about 14 atomic percent chromium (Cr), and a balance of niobium (Nb), based on the total composition of the Nb based RMICs. More preferably, the Nb based RMICs comprise about 19 to about 24 atomic percent titanium, about 1 to about 5 atomic percent hafnium, up to about 7 atomic percent tantalum (Ta), about 11 to about 22 atomic percent silicon, up to about 6 atomic percent germanium (Ge), up to about 12 atomic percent boron (B), about 5 to about 14 atomic percent chromium, up to about 4 atomic percent iron (Fe), up to about 4 atomic percent aluminum (Al), up to about 3 atomic percent tin (Sn), up to about 3 atomic percent tungsten (W), up to about 3 atomic percent molybdenum (Mo), and a balance of niobium, based on the total composition of the Nb based RMICs. Most preferably, silicon, germanium, and boron together comprise about 11 to about 25 atomic percent of the Nb based RMIC, iron and chromium together comprise about 5 to about 18 atomic percent of the Nb based RMIC, and the ratio of the sum of atomic percentages of niobium and tantalum present in the Nb based RMIC to the sum of atomic percentages of titanium and hafnium in the Nb based RMIC is about 1.4 to about 2.2, i.e., 1.4<(Nb+Ta):(Ti+Hf)<2.2.

In another exemplary embodiment, the molybdenum-silicide based composite that may be used to form the turbine components 11 of the turbine system 10 comprises at least 10 volume percent of at least one molybdenum-silicide and further comprises boron, chromium or a combination of boron and chromium. Molybdenum-silicides include, but are not limited to, $MoSi_2$, $Mo_3Si$, $Mo_5Si_3$, and $Mo_5SiB_2$. The molybdenum-silicide based composite preferably comprises about 2.5 to about 13.5 atomic percent silicon, about 3.5 to about 26.5 atomic percent boron, and a balance of molybdenum based on the total composition of the molybdenum-silicide based composite. In yet another exemplary embodiment, the molybdenum-silicide based composite may comprise about 13 to about 16 atomic percent silicon, about 25 to about 40 atomic percent chromium, and a balance of molybdenum based on the total composition of the molybdenum-silicide based composite. The molybdenum-silicide based composite may also include other elements, for example, tantalum, titanium, zirconium, rhenium, carbon, hafnium, germanium, tungsten, vanadium, tin, and aluminum.

Figure 2:
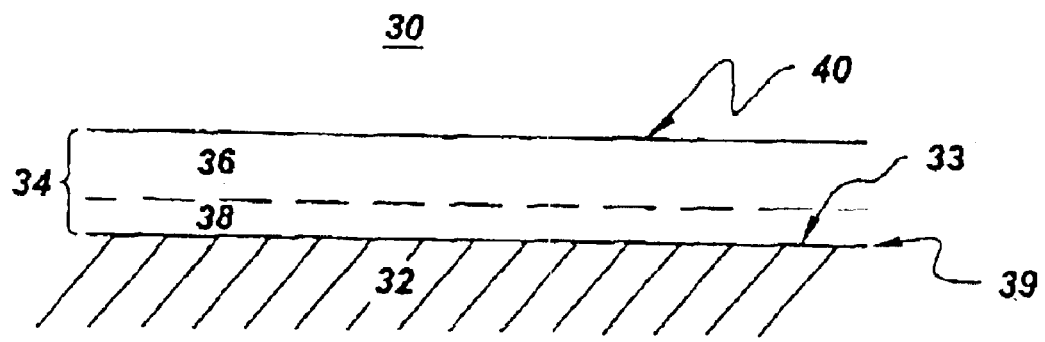
FIG. 2 is a schematic cross-sectional view of an environmentally resistant coating deposited on a niobium based refractory metal intermetallic composite or a molybdenum-silicide based composite substrate.

The turbine components 11 may be formed by a variety of different processes such as, but not limited to, powder metallurgy processes (e.g., sintering, hot pressing, hot isostatic processing, hot vacuum compaction, and the like), ingot casting followed by directional solidification, ingot casting followed by thermo-mechanical treatment, near-net-shape casting, chemical vapor deposition, physical vapor deposition, and the like. As stated above, in order to prevent the turbine components 11 from degradation due to oxidation and pesting, an environmentally resistant coating 34 may be disposed at a surface 33 of a substrate 32 to form a coated article 30, such as a coated turbine component, as is shown in FIG. 2.

It is generally desirable that the environmentally resistant coating 34 is crystalline and comprises tin and yttrium (Y) in amounts of greater than or equal to about 0.05 atomic percent, and preferably further comprises chromium and aluminum. In one embodiment, the environmentally resistant coating 34 comprises about 10 to about 67 atomic percent chromium, up to about 25 atomic percent silicon, about 5 to about 55 atomic percent aluminum, about 15 to about 45 atomic percent of a combination of niobium and titanium, and an amount of greater than or equal to about 0.05 atomic percent of a combination of tin and yttrium based on the total coating. The environmentally resistant coating 34 may optionally contain up to 20 atomic percent of germanium and up to about 20 atomic percent of iron if desired. Preferably, the environmentally resistant coating 34 is crystalline and comprises up to about 15 atomic percent silicon, about 15 to about 52 atomic percent chromium, about 30 to about 50 atomic percent aluminum, about 10 to about 25 atomic percent niobium, about 5 to about 20 atomic percent titanium, up to about 15 atomic percent germanium, up to about 8 atomic percent iron, and an amount of greater than or equal to about 0.05 atomic percent of a combination of tin and yttrium based on the total coating.

In another embodiment the environmentally resistant coating 34 is crystalline and comprises about 25 to about 60 atomic percent chromium, up to about 20 atomic percent aluminum, about 2 to about 40 atomic percent niobium, about 5 to about 67 atomic percent silicon, about 2 to about 40 atomic percent titanium, up to about 20 atomic percent germanium, up to about 10 atomic percent iron, and an amount of greater than or equal to about 0.05 atomic percent of a combination of tin and yttrium, based on the total coating. Preferably the environmentally resistant coating 34 comprises about 40 to about 60 atomic percent chromium, up to about 20 atomic percent aluminum, about 20 to about 25 atomic percent niobium, about 10 to about 20 atomic percent silicon, about 8 to about 10 atomic percent titanium, up to about 10 atomic percent iron, and an amount of greater than or equal to about 0.05 atomic percent of a combination of tin and yttrium based on the total coating. Also preferably the environmentally resistant coating 34 is crystalline and comprises about 25 to about 40 atomic percent chromium, up to about 4 atomic percent aluminum, about 5 to about 15 atomic percent niobium, about 49 to about 64 atomic percent silicon, about 5 to about 10 atomic percent titanium, up to about 4 atomic percent iron, and an amount of greater than or equal to about 0.05 atomic percent of a combination of tin and yttrium based on the total coating.

The environmentally resistant coating 34 may be applied to a substrate 32 by one of or a combination of deposition techniques. A preferred technique is to coat the substrate 32 with a slurry comprising the coating composition. The coating composition may be applied by dipping the substrate 32 into the slurry, or by painting or spray painting the substrate 32 with the slurry. The coating composition comprises tin and yttrium in an amount effective to provide a coating comprising tin and yttrium in an amount of greater than or equal to about 0.05 atomic percent based upon the total coating. The coating composition may preferably also comprise a viscous binder if desired. After dipping the substrate 32 in the coating composition, the coated substrate may be preferably heat treated at a temperature of at least about 1200° C., for at least about one hour, to form the environmentally resistant coating 34. An additional heat treatment at temperatures up to about 1600° C. for a time period of up to about 10 hours may be used to consolidate the environmentally resistant coating 34.

When the substrate 32 comprises a Nb based RMIC composite, the coating composition can be chosen to form the environmentally resistant coating 34 with a minimum of reaction with the Nb based RMIC substrate 32 (so that the formed coating 34 and the coating composition have a similar composition). Alternatively, the coating composition can be chosen to form the environmentally resistant coating 34 as a result of a substantial reaction with the Nb based RMIC substrate 32 to effectively double the coating 34 thickness, compared with the initial thickness of the applied coating composition. Thus, for example, a coating composition comprising a combined amount of tin and yttrium greater than or equal to about 0.1 atomic percent, may, after being applied to the substrate and subjected to heat treatment, form a crystalline coating having a combined amount of tin and yttrium greater than or equal to about 0.05 atomic percent.

When the substrate 32 comprising a molybdenum-silicide based composite, the coating composition is chosen to form the environmentally resistant coating 34 with a minimum of reaction with the molybdenum-silicide based composite. Thus as may be seen in FIG. 2, region 36 of the coating would remain molybdenum-free, while region 38 represents the region where the coating adheres with molybdenum-silicide based composite and where little or no reaction occurs.

Other methods, including ion plasma deposition, vacuum plasma spraying, high velocity oxy-flame spraying, physical vapor deposition, chemical vapor deposition, and combinations comprising at least one of the foregoing methods, can be used to deposit the components such as silicon, chromium, titanium, and niobium on the substrate 32, preferably a Nb based RMIC substrate or the molybdenum-silicide based substrate. The environmentally resistant coating 34 may preferably be bonded to the Nb based RMIC substrate or the molybdenum-silicide based substrate 32 by heating to a temperature of at least about 1200° C., for at least about one hour.

The environmentally resistant coating 34 that is formed on the Nb based RMIC composite substrate 32 may further comprise several different and distinct phases. The primary phase in the environmentally resistant coating 34 is C14 Laves of the form $(Nb,Ti)(Cr,Si,Al)_2$, with about 30 to about 37 atomic percent of niobium or combinations comprising niobium and titanium, and about 63 to about 70 atomic percent of (Cr,Si,Al), where the specific ranges are about 28 to about 60 atomic percent chromium, up to about 35 atomic percent silicon, and up to about 42 atomic percent of aluminum. Either aluminum or silicon is generally present in the C14 Laves phase.

In one embodiment, when the coating composition comprises about 5 to about 55 atomic percent aluminum, the environmentally resistant coating 34 may comprise a primary phase of the form $(Nb,Ti,Cr)Al_3$, with about 72 to about 78 atomic percent aluminum and about 22 to about 28 atomic percent (Nb,Ti,Cr), where the specific ranges are about 17 to about 28 atomic percent of niobium or a combination of niobium or titanium and up to about 5 atomic percent chromium. In another embodiment, the environmentally resistant coating 34 may comprise several additional primary phases of the form $(Cr,Nb,Ti)_5Si_3$, with about 35 to about 39 atomic percent silicon and about 61 about 65 atomic percent (Cr,Ti,Nb), where the specific ranges are about 40 to about 60 atomic percent chromium, up to about 5 atomic percent niobium and about 5 to about 25 atomic percent Ti. In yet another embodiment, primary phases having the composition $(Cr, Nb, Ti)_{11} Si_8$, with about 39 to about 43 atomic percent silicon, about 57 to about 61 atomic percent (Cr,Nb,Ti), having about 30 to about 38 atomic percent chromium and about 20 to about 30 atomic percent of either niobium or a combination of niobium and titanium. Another primary phase may be of the form $(Cr,Ti,Nb)_6Si5$, with about 44 to about 47 atomic percent silicon, and about 53 to about 56 atomic percent (Cr,Nb,Ti), having about 25 to about 45 atomic percent chromium and about 10 to about 30 atomic percent of niobium or a combination of niobium and titanium.

Several other minor phases may also be present in the environmentally resistant coating 34. These include $CrSi_2$, CrSi, and $Cr_3Si$, each of which is narrowly stoichiometric, with an amount of less than or equal to about 5 atomic percent of niobium or a combination of niobium and titanium. In general, the body centered cubic (bcc) portion of the chromium solid solution may be replaced with with niobium, titanium, silicon, or aluminum, while the bcc portion of the niobium solid solution may be replaced with titanium, chromium, silicon, aluminum, the C15 Laves $(Nb,Ti,Cr)_2Al$, $Nb_5Si_3$ or $Ti_5Si_3$. In all of the phases, iron may be used to partially replace chromium, and both chromium and germanium (Ge) can partially replace silicon. The additions of yttrium and tin may be distributed in these phases, or may form separate phases, but their effects are not significant on the phase equilibria, but rather on the oxidation behavior.

These phases may also contain small amounts of chromium and hafnium, and may be concentrated in the surface zone 36, rather than in an interfacial zone 38 adjacent to the interface 39 between the environmentally resistant coating 34 and the molybdenum-silicide based composite substrate 32 as can be seen in FIG. 2.

In general, the environmentally resistant coating 34 is a crystalline coating and has a crystalline content greater than or equal to about 60 weight percent (wt %), preferably greater than or equal to about 80 wt %, and most preferably greater than or equal to about 95 wt %, based on the total weight of the coating composition. In general the thickness of the environmentally resistant coating 34 is about 10 to about 200 micrometers. Within this range, a thickness of greater than or equal to about 15 micrometers, preferably greater than or equal to about 20 micrometers, and most preferably greater than or equal to about 25 micrometers is desirable. Within this range, a thickness of less than or equal to about 175 micrometers, preferably less than or equal to about 150 micrometers and most preferably less than or equal to about 125 micrometers is desirable. As defined herein, the environmentally resistant coating is one that will provide increased resistance to oxidation at temperatures of about 1090° C. to about 1370° C. and/or increased resistance to pesting at temperatures of about 760° C. to about 980° C.

Figure 3:
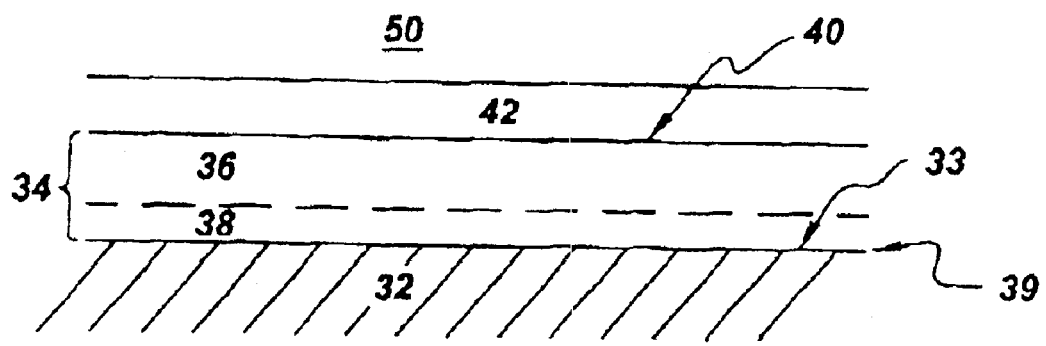
FIG. 3 is a schematic cross-sectional view of a thermal barrier coating and an environmentally resistant coating deposited on a niobium based refractory metal intermetallic composite or a molybdenum-silicide based composite substrate.

In another embodiment, a thermal barrier coating 42 may be applied to the environmentally resistant coating 34 to provide a thermal barrier coated article 50, such as a coated turbine component, as shown in FIG. 3. The thermal barrier coating 42 is deposited on the outer surface 40 of the environmentally resistant coating 34. The thermal barrier coating 42 has a thickness of about 50 microns to about 400 microns, and may comprise zirconia, zirconia stabilized by the addition of other metals, such as yttrium, magnesium, cerium, and the like, zircon and mullite, and other refractory materials having similar properties. Combinations of the above materials may also be used. Once the thermal barrier coating 42 and environmentally resistant coating 34 have been applied to a turbine component, the thermal barrier coated turbine article 50 may be installed in a turbine system.

The above-described methods of making turbine components and coating them with environmentally resistant coatings have a number of advantages over other methods described in the prior art. The environmentally resistant coatings protect the turbine components derived from Nb based RMICs or molybdenum-silicide based composites from undergoing oxidation at higher temperatures of about 1090° C. to about 1370° C. In addition, they protect the turbine components from undergoing pesting at lower temperatures of about 760° C. to about 980° C. The environmentally resistant coatings are advantageous in that they display good adhesion to the thermal barrier coatings, which provide an additional layer of protection to the turbine components.

The following examples, which are meant to be exemplary, not limiting, illustrate compositions and methods of manufacturing some of the various embodiments of the environmentally resistant coatings using various materials and apparatus.

EXAMPLE 1

Figure 4:
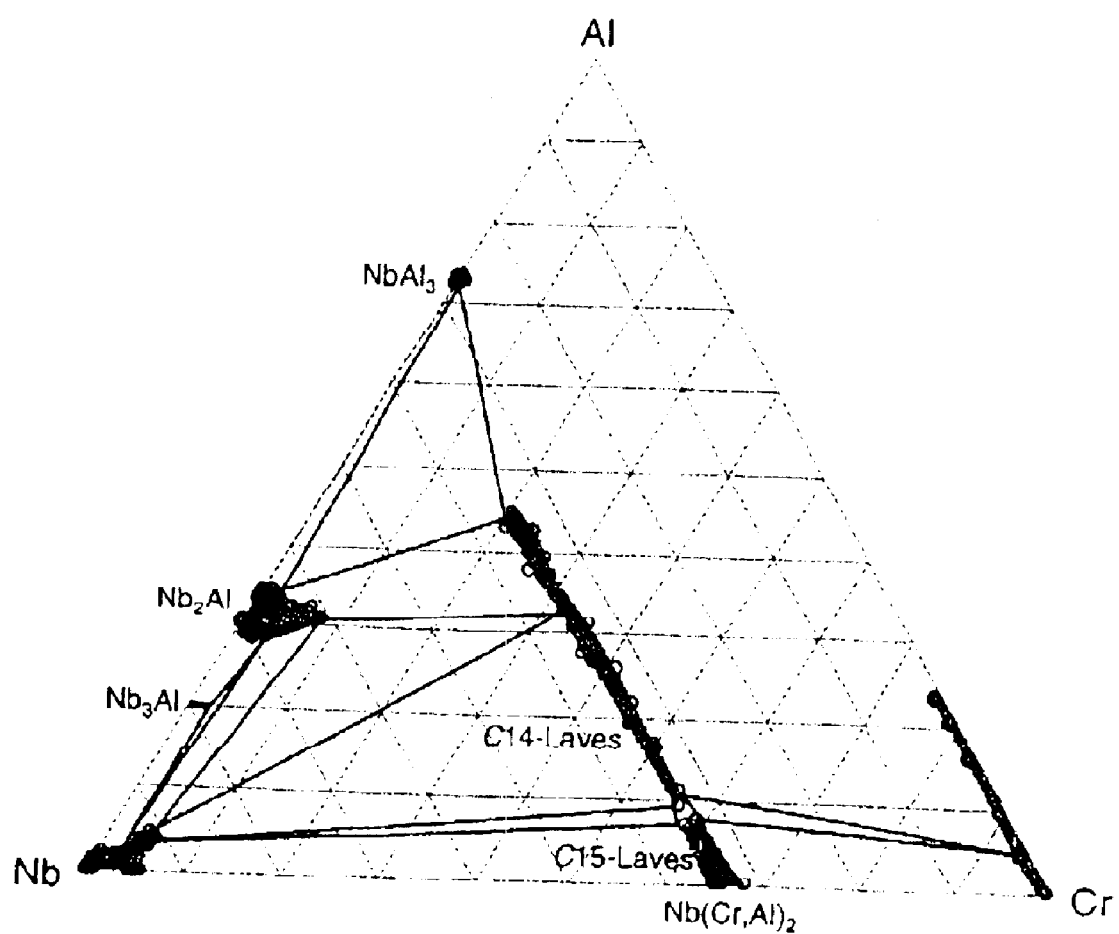
FIG. 4 is a graphical representation of a phase diagram for an Nb—Al—Cr ternary system.

In this example, five alloy compositions (Samples 1–5 in Table 1) were selected based upon a point near the end of the C14-Laves phase in the niobium-aluminum-chromium (Nb—Al—Cr) ternary system shown in FIG. 4. Samples 1–4 are comparative compositions. In addition, three alloy compositions (Samples 6–8 in Table 1) were studied based upon a point in the two-phase region between the C14-Laves and Laves +NbAl$_3$ phases in the niobium-aluminum-chromium (Nb—Al—Cr) system as shown in FIG. 4. Of these three compositions, Samples 6 and 7 are comparative compositions. All the ingredients shown in Table 1 are measured in atomic percentages.

Ingots of each alloy composition having a 5 cm diameter× 3.8 cm thickness were produced by vacuum arc melting. Pins of size 0.3 cm diameter×2.9 cm long were then machined from each arc-cast ingot. The pins were independently oxidized in an open-air furnace for either 100 hours at 871° C., 1204° C., and 1315° C. respectively, or for 10 hours at 1371° C. The furnaces provided a static air ambient atmosphere for the exposures. Following oxidation in the furnace, optical and scanning electron microscopy (SEM) was performed on each of the oxidized pins to determine the depth of penetration of the oxide layer into the material, and to observe microstructural characteristics and phase stability within each alloy. X-ray microanalysis was also performed at several points within each alloy pin to determine the composition of pertinent phases and the oxide layer.

Oxidation penetration in the alloy pins was measured by two different methods. The first method consists of obtaining fifteen measurements of oxide penetration around the perimeter of the pin. Average and standard deviation values were calculated for each set of measurements obtained. The second method consists of subtracting the cross-sectional area of each pin determined 'to be un-oxidized' from the total cross-sectional area of each pin. The second measurement method more accurately takes into account that some of the surface oxide formed on the pin may have been lost in the sample preparation steps.

TABLE 1

| Sample # | Niobium | Titanium | Aluminum | Silicon | Germanium | Chromium | Iron | Tin | Yttrium | Tungsten |
|---|---|---|---|---|---|---|---|---|---|---|
| 1* | 30 | — | 40 | — | — | 30 | — | — | — | — |
| 2* | 20 | — | 40 | 20 | — | 20 | — | — | — | — |
| 3* | 20 | — | 40 | 10 | 10 | 20 | — | — | — | — |
| 4* | 10 | 10 | 40 | 10 | 10 | 20 | — | — | — | — |
| 5 | 10 | 8 | 38 | 10 | 8 | 20 | 4 | 2 | 0.2 | — |
| 6* | 29.9 | — | 49 | — | — | 20 | — | — | 0.1 | 1 |
| 7* | 15 | 15 | 49 | — | — | 20 | — | — | 0.2 | — |
| 8 | 14.8 | 12 | 45 | — | — | 20 | 4 | 4 | 0.2 | — |

*Comparative Examples
All the ingredients are in atomic percent.

Figure 5:
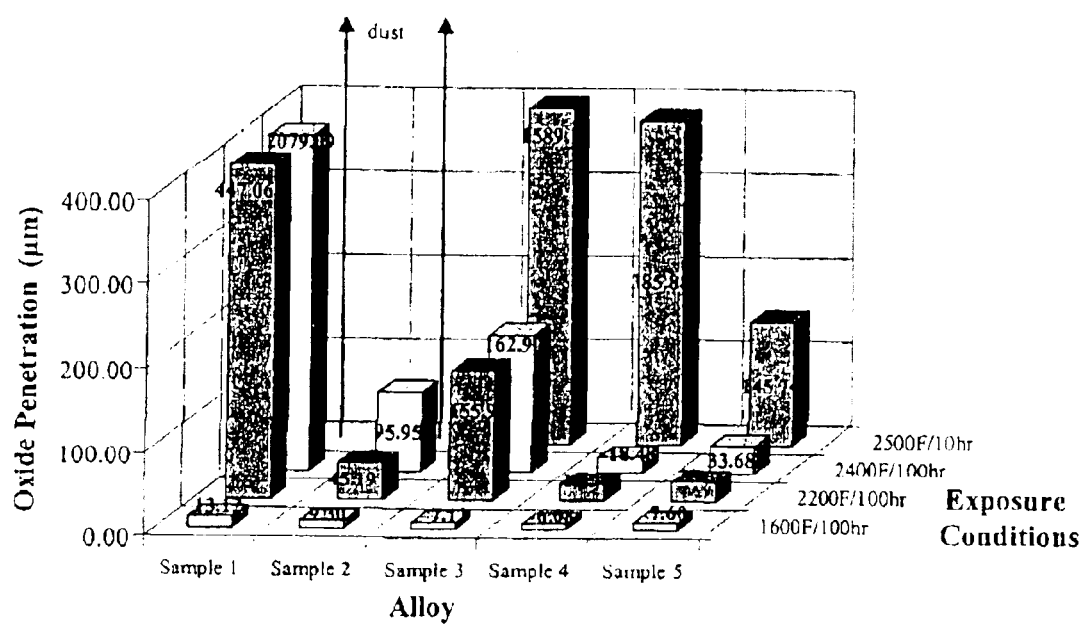
FIG. 5 is a graphical representation of oxide penetration measurements for Samples 1–5 at different conditions of temperature and time.
Figure 6:
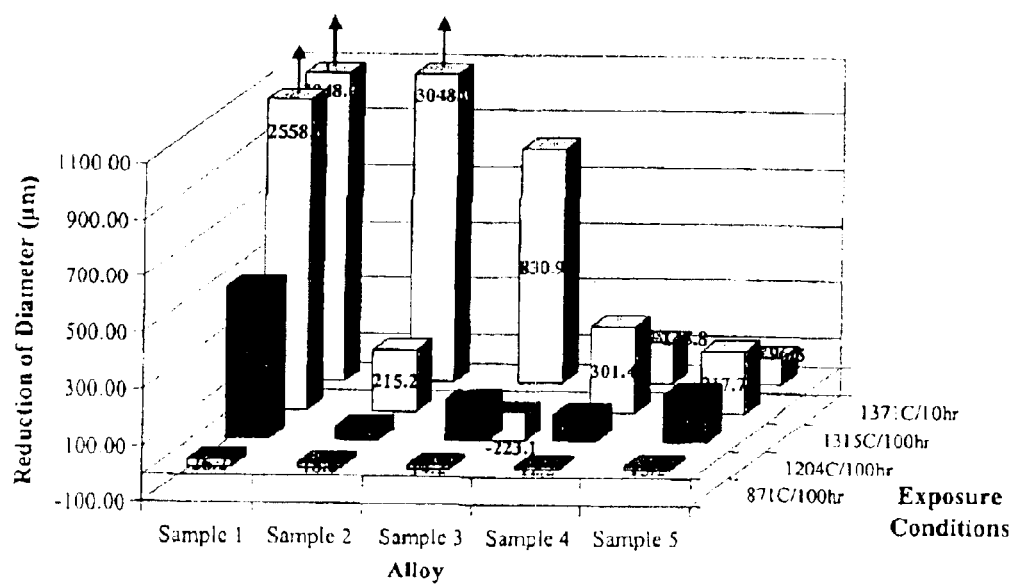
FIG. 6 is a graphical representation of the reduction in diameter for Samples 1–5 at different conditions of temperature and time.

The results for oxygen penetration obtained by the first method for Samples 1–8 are shown in Table 2 below, while the reduction in pin diameter obtained by the second method is shown in Table 3 below. The results for oxygen penetration and reduction in pin diameter made by the first and second methods are also depicted in FIGS. 5 and 6 respectively.

TABLE 2

| | 871° C./100 hr | | 1204° C./100 hr | | 1315° C./100 hr | | 1371° C./10 hr | |
|---|---|---|---|---|---|---|---|---|
| Sample # | Mean (μm)** | σ | Mean (μm)** | σ | Mean (μm)** | σ | Mean (μm)** | Σ |
| 1* | 13.12 | 1.42 | 447.06 | 7.62 | 2079.09 | 17.36 | — | — |
| 2* | 9.30 | 7.13 | 45.19 | 3.78 | 95.95 | 10.45 | — | — |
| 3* | 7.13 | 6.08 | 155.97 | 13.79 | 162.90 | 18.48 | 0.00 | 45.62 |
| 4* | 6.08 | 0.34 | 19.90 | 2.11 | 18.48 | 3.47 | 385.88 | 9.64 |
| 5 | 7.60 | 1.23 | 23.36 | 4.57 | 33.68 | 6.54 | 145.74 | 27.98 |

TABLE 2-continued

| Sample # | 871° C./100 hr Mean (μm)** | σ | 1204° C./100 hr Mean (μm)** | σ | 1315° C./100 hr Mean (μm)** | σ | 1371° C./10 hr Mean (μm)** | Σ |
|---|---|---|---|---|---|---|---|---|
| 6* | — | | 311.46 | 12.04 | 353.77 | 48.52 | — | — |
| 7* | 13.29 | 0.44 | 35.43 | 0.84 | 33.33 | 0.12 | 8.47 | 2.09 |
| 8 | 12.26 | 1.04 | 16.93 | 2.56 | 18.40 | 3.20 | 24.71 | 2.48 |

*Comparative Examples
**Mean depth of oxide penetration in micrometers (μm)
σ = standard deviation of oxide penetration in micrometers (μm)

TABLE 3

| Sample # | 871° C./ 100 hr** | 1204° C. 100 hr** | 1315° C./ 100 hr** | 1371° C./ 10 hr** |
|---|---|---|---|---|
| 1* | 26.24 | 532.61 | 2558.65 | 3048.00 |
| 2* | 18.60 | 47.57 | 215.21 | 3048.00 |
| 3* | 14.24 | 137.89 | −223.09 | 830.94 |
| 4* | 12.16 | 93.65 | 301.35 | 145.78 |
| 5 | 15.20 | 164.20 | 217.72 | 96.54 |
| 6* | 3022.60 | 1069.64 | 2669.13 | 3048.00 |
| 7* | 26.60 | 86.55 | 172.78 | 108.40 |
| 8 | 24.60 | 162.14 | 577.70 | 178.11 |

*Comparative Examples
**Pin diameter reduction values in micrometers (μm)

FIGS. 5 and 6 are graphs showing the effect of alloy composition and exposure temperature on oxide penetration for Samples 1–5. FIG. 5, shows that the alloy of Sample 2 obtained by addition of silicon to the C14-Laves phase dramatically improves oxidation resistance during exposure at 871° C., 1204° C., and 1315° C. when compared with Sample 1. Further additions of germanium and titanium to Sample 2, create the alloy of Sample 4, which shows a better resistance to oxide penetration than Samples 1, 2 and 3. Similarly the addition of germanium, titanium, and iron along with a small amount of tin and yttrium to create Sample 5, further provides improvements in oxidation resistance for these alloys. For example, upon exposure at 1371° C. for 10 hours Samples 1 and 2 quickly underwent oxidation and disintegrated into dust. On the other hand, Sample 5, which contained the germanium, titanium, and iron, tin and yttrium, showed improved oxidation resistance at 1371° C. over Samples 1–4 when retained at this temperature for a period of 10 hours. No significant oxidation or low temperature pesting was observed in any of the samples exposed to 871° C. for a period of 100 hours.

FIG. 6 shows a plot wherein reduction in pin diameter (measured by the second method) due to oxidation is compared for the Samples 1–5 when subjected to the aforementioned temperature conditions. The data plotted in FIG. 6 were calculated assuming that the pin was perfectly cylindrical before and after the pin was exposed to the high temperature oxidation. In this figure it is clear that pins created from the composition of Sample 1, was drastically reduced in size by oxidation upon exposure at 1204° C., 1315° C. and 1371° C. FIG. 6, also shows that Sample 5 undergoes the least reduction in pin diameter when exposed to temperatures of 1371 ° C. for 10 hours.

Figure 7:
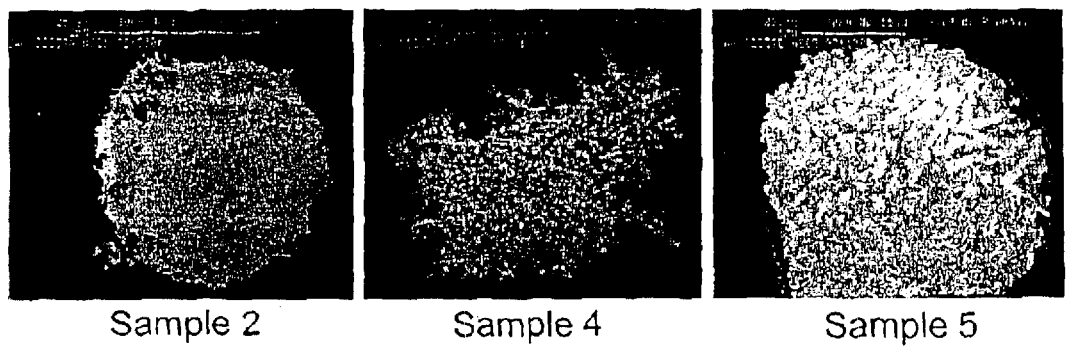
FIG. 7 depicts photomicrographs showing oxidation penetration of Samples 2, 4 and 5.

Backscattered electron micrographs (taken in a scanning electron microscope) of Samples 2, 4, and 5 pins are shown in FIG. 7 after exposure at 1315° C. for 100 hours. These micrographs reflect oxidation penetration around the pin perimeter. The porosity in Samples 2 and 4 is most likely due to the porosity in the case ingot. The pin made from the composition of Sample 4 may have been insufficiently homogenized during ingot making, as it apparently melted during oxidation. Sample 5 on the other hand reflects very little porosity indicating greater oxidation resistance.

Figure 8:
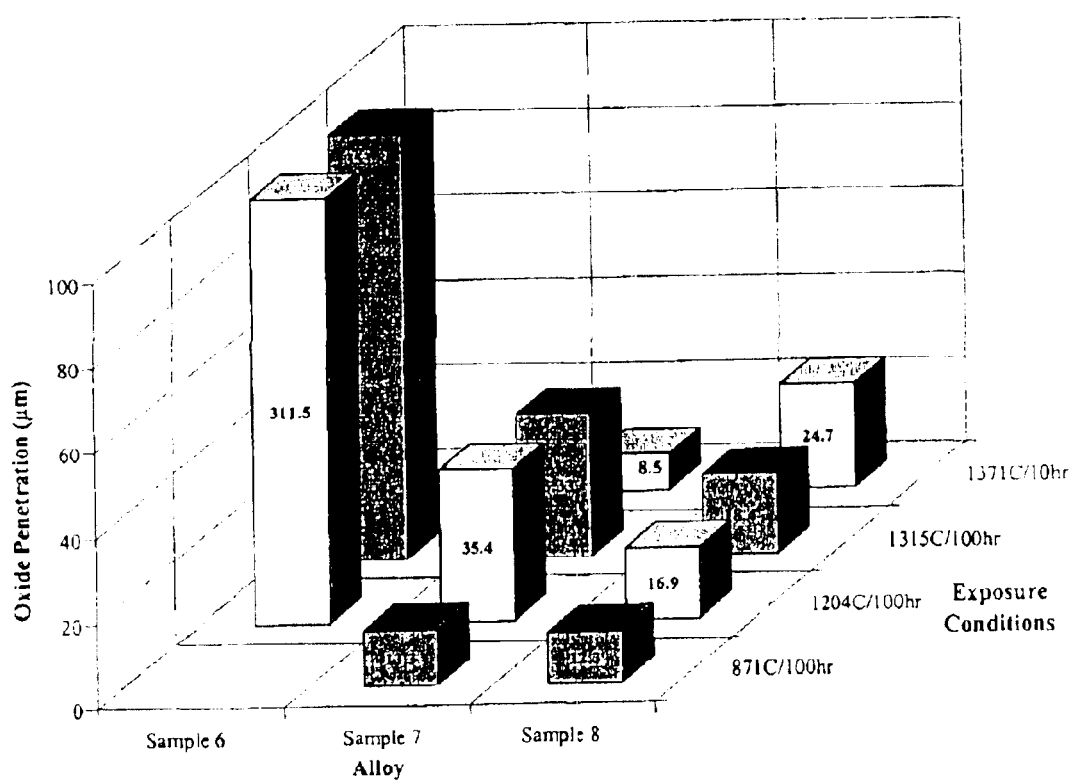
FIG. 8 is a graphical representation of oxide penetration measurements for Samples 6–8 at different conditions of temperature and time.
Figure 9:
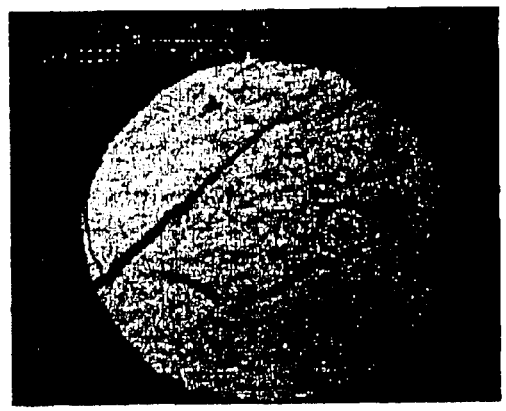
FIG. 9 depicts photomicrographs showing oxidation penetration of Samples 7 and 8.
Figure 9:
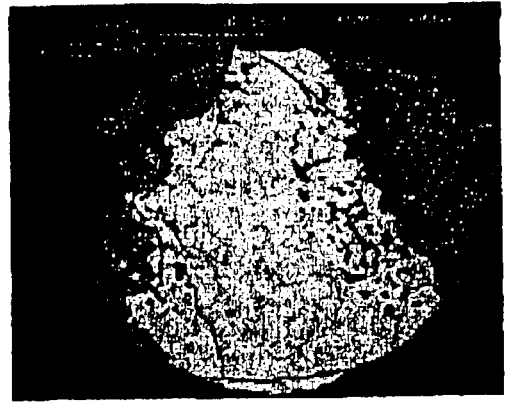

FIG. 8 is a plot depicting oxidation penetration in Samples 6, 7 and 8 as a function of exposure conditions and alloy composition. Once again Sample 8, which contains tin and yttrium shows better resistance to oxidation penetration than Samples 6 at all temperatures and a better resistance to oxide penetration at 1204° C. and 1315° C. than Sample 7. Sample 6 pins exposed at 871° C. for 100 hours or 1371° C. for 10 hours disintegrated to powders in the furnace due to extreme oxidation. FIG. 9 shows micrographs of cross-sections of pins having the composition of Samples 7 and 8. Micrographs of these alloy pins show minimal oxide penetration around the perimeter of the sample. The excess porosity in Sample 8 is most likely due to the porosity in the in cast ingot.

As shown in the above examples, the above-described methods of making turbine components and coating them with the crystalline environmentally resistant coatings have a number of advantages over other methods described in the prior art. Samples 5 and 8 advantageously provide a superior resistance to oxide penetration at elevated temperatures as high as 1371° C. and can therefore protect the turbine components derived from Nb based RMICs or molybdenum-silicide based composites from undergoing oxidation at temperatures of about 1090° C. to about 1370° C. In addition, they have proven that they can be capable of protecting the turbine components from undergoing pesting at lower temperatures of about 760° C. to about 980° C. The substrates with the environmentally resistant coatings are further advantageous in that the substrates display thermal expansion behavior very similar to the thermal barrier coatings. This similarity in thermal expansion behavior promotes reduced thermal expansion mismatching between the two layers thereby reducing thermal stresses, which provides additional protection to the turbine components.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine component comprising:

a substrate; and a crystalline coating disposed on a surface of the substrate, wherein the crystalline coating comprises chromium, aluminum, niobium, tin and yttrium, and wherein the tin and yttrium are present in an amount greater than or equal to about 0.05 atomic percent based upon the total coating.

2. The turbine component of claim 1, wherein the substrate is a niobium based refractory metal intermetallic composite comprising titanium, hafnium, silicon, chromium, and niobium or a molybdenum-silicide based composite comprising molybdenum, silicon, and either boron, chromium or a combination of boron and chromium.

3. The turbine component of claim 1, wherein the substrate is selected from the group consisting of rotating blades, non-rotating vanes, shrouds, nozzles, and combustors.

4. The turbine component of claim 1, wherein the substrate is part of aircraft turbine system, a landcraft turbine system or a watercraft turbine system.

5. The turbine component of claim 1, wherein the substrate further comprises a thermal barrier coating disposed on a surface of the crystalline coating on a side opposite the substrate.

6. The turbine component of claim 1, wherein the crystalline coating comprises about 25 to about 60 atomic percent chromium, up to about 20 atomic percent aluminum, about 2 to about 40 atomic percent niobium, and further comprises about 5 to about 67 atomic percent silicon, about 2 to about 40 atomic percent titanium, up to about 20 atomic percent germanium, and up to about 10 atomic percent iron, based upon the total coating.

7. A turbine system comprising the turbine component of claim 1.

8. A crystalline coating comprising aluminum, niobium, chromium, tin and yttrium, and wherein the tin and yttrium are present in an amount greater than or equal to about 0.05 atomic percent based upon the total coating.

9. The crystalline coating of claim 8, comprising about 10 to about 67 atomic percent chromium, about 5 to about 55 atomic percent aluminum, and further comprising about 15 to about 45 atomic percent of a combination of niobium and titanium, based upon the total coating.

10. The crystalline coating of claim 8, comprising about 15 to about 52 atomic percent chromium, about 30 to about 50 atomic percent aluminum, about 10 to about 25 atomic percent niobium, and further comprising up to about 15 atomic percent silicon, about 5to about 20 atomic percent titanium, up to about 15 atomic percent germanium, and up to about 8 atomic percent iron, based upon the total coating.

11. The crystalline coating of claim 8, further comprising about 20 atomic percent chromium, about 37.9 atomic percent aluminum, about 10 atomic percent niobium, and further comprising about 8 atomic percent titanium, about 10 atomic percent silicon, about 8 atomic percent germanium, and about 4 atomic percent iron, based upon the total coating.

12. The crystalline coating of claim 8, comprising about 4 atomic percent tin, and about 0.2 atomic percent yttrium, and further about 20 atomic percent chromium, about 45 atomic percent aluminum, about 14.8 atomic percent niobium, and further comprising about 12 atomic percent titanium, about 4 atomic percent iron, based upon the total coating.

13. The crystalline coating of claim 8, comprising about 25 to about 60 atomic percent chromium, up to about 20 atomic percent aluminum, about 2 to about 40 atomic percent niobium, and further comprising about 5 to about 67 atomic percent silicon, about 2 to about 40 atomic percent titanium, up to about 20 atomic percent germanium, and up to about 10 atomic percent iron, based upon the total coating.

14. The crystalline coating of claim 8, comprising about 40 to about 60 atomic percent chromium, up to about 20 atomic percent aluminum, about 20 to about 25 atomic percent niobium, and further comprising about 10 to about 20 atomic percent silicon, about 8 to about 10 atomic percent titanium, and up to about 10 atomic percent iron, based upon the total coating.

15. The crystalline coating of claim 8, comprising about 25 to about 40 atomic percent chromium, up to about 4 atomic percent aluminum, about 5 to about 15 atomic percent niobium, and further comprising about 49 to about 64 atomic percent silicon, about 5 to about 10 atomic percent titanium, and up to about 4 atomic percent iron, based upon the total coating.

16. The crystalline coating of claim 8, wherein the coating has C14 Laves of the form $(Nb,Ti)(Cr,Si,Al)_2$, with about 30 to about 37 atomic percent of niobium or combinations comprising niobium and titanium, and about 63 to about 70 atomic percent of chromium, silicon and aluminum.

17. The crystalline coating of claim 8, wherein the coating comprises primary phases of the form $(Nb,Ti,Cr)Al_3$, $(Nb,Ti,Cr)_2Al$, $Nb_5Si_3$, $Ti_5Si_3$, $(Cr,Nb,Ti)_5Si_3$, $(Cr,Nb,Ti)_{11}Si_8$, $(Cr,Ti,Nb)_6Si_5$, $CrSi_2$, $CrSi$, $Cr_3Si$ or combinations comprising at least one of the foregoing phases.

* * * * *